United States Patent [19]

Bennett

[11] 4,270,975
[45] Jun. 2, 1981

[54] LIQUID-VAPOR SEPARATION DEVICE AND METHOD

[75] Inventor: Richard C. Bennett, Park Forest, Ill.
[73] Assignee: Whiting Corporation, Harvey, Ill.
[21] Appl. No.: 97,659
[22] Filed: Nov. 27, 1979
[51] Int. Cl.³ .............................................. B01D 1/06
[52] U.S. Cl. .................................. 159/27 A; 202/197; 55/421; 55/440; 55/12; 122/488
[58] Field of Search ..................... 55/421, 17, 46, 440; 202/197; 122/492, 491, 488–490; 159/1, 6, 27

[56] References Cited

U.S. PATENT DOCUMENTS 2,654,351  10/1953  Ammon ............................... 122/488

FOREIGN PATENT DOCUMENTS 263601  6/1970  U.S.S.R. ...................................... 55/440

Primary Examiner—Norman Yudkoff
Attorney, Agent, or Firm—Lockwood, Dewey, Alex & Cummings

[57] ABSTRACT

A liquid-vapor separation device and method, including a generally horizontally-disposed arcuate passageway which interconnects the outlet of the tube side of a heater component of an evaporator to a condensor or subsequent effect heater. A floor plate is disposed in the arcuate passageway in spaced-away relation from the side walls thereof so as to permit drainage of liquid collected on the interior walls of the passageway into a liquid-collecting section which is provided with a suitable drain for removal of the thus-collected liquid. The floor plate is of sufficient size to minimize re-entrainment of the collected liquid. Adjacent the outlet end of the device anti-swirl baffles are provided to eliminate turbulence in the vapor adjacent such outlet end.

17 Claims, 13 Drawing Figures

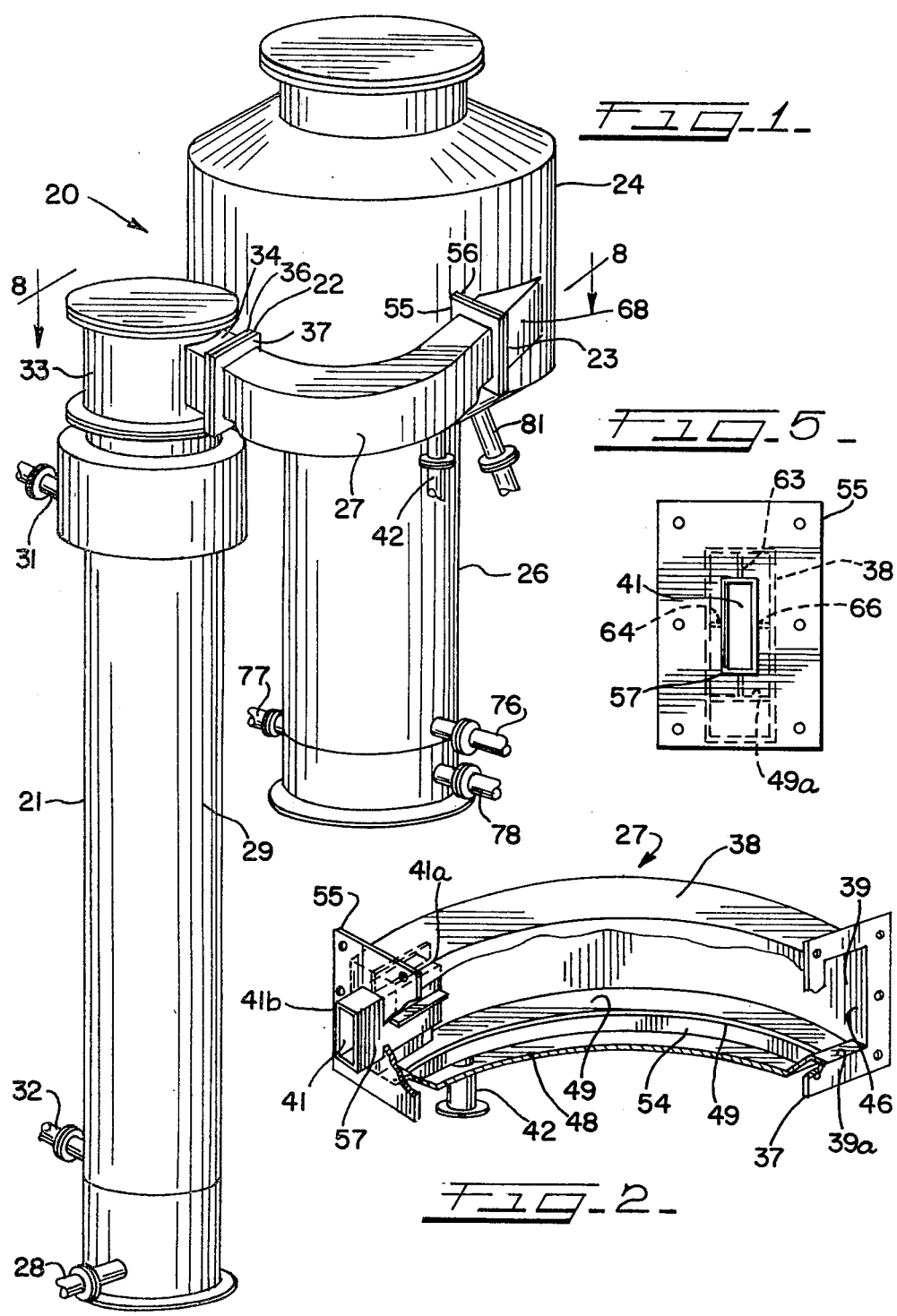

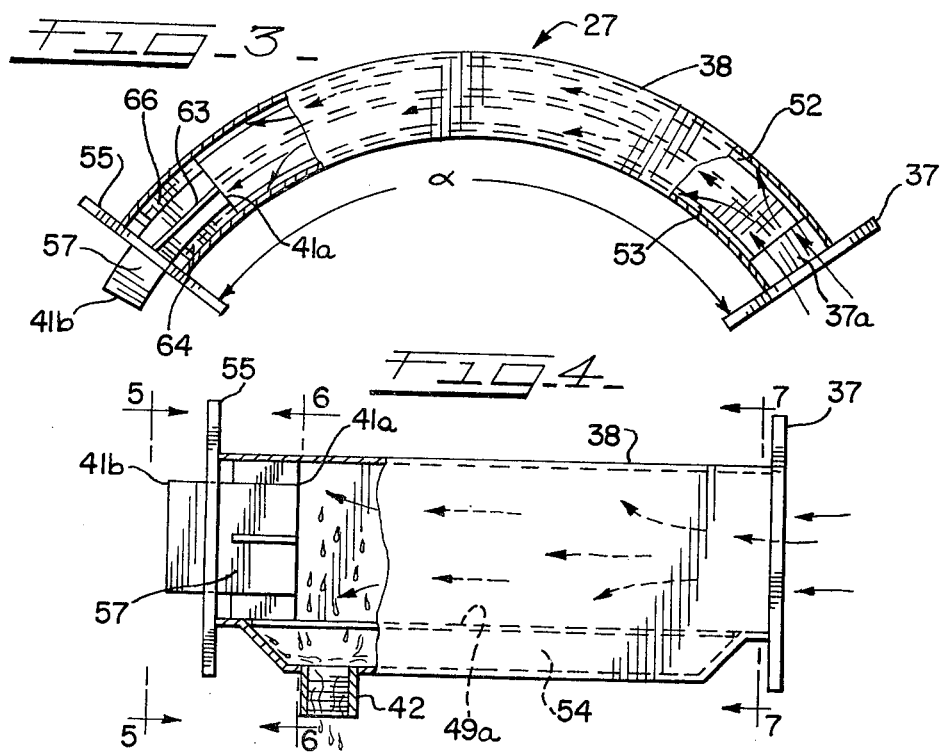
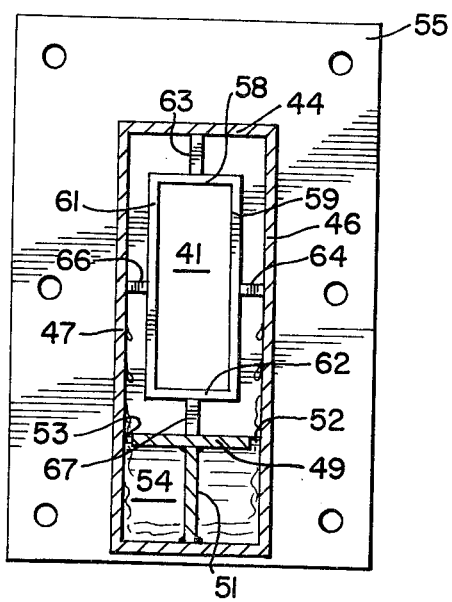
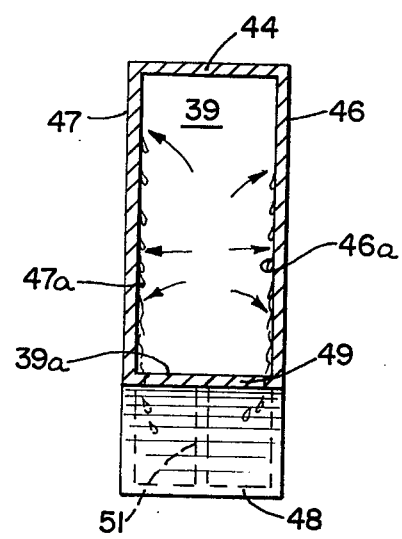

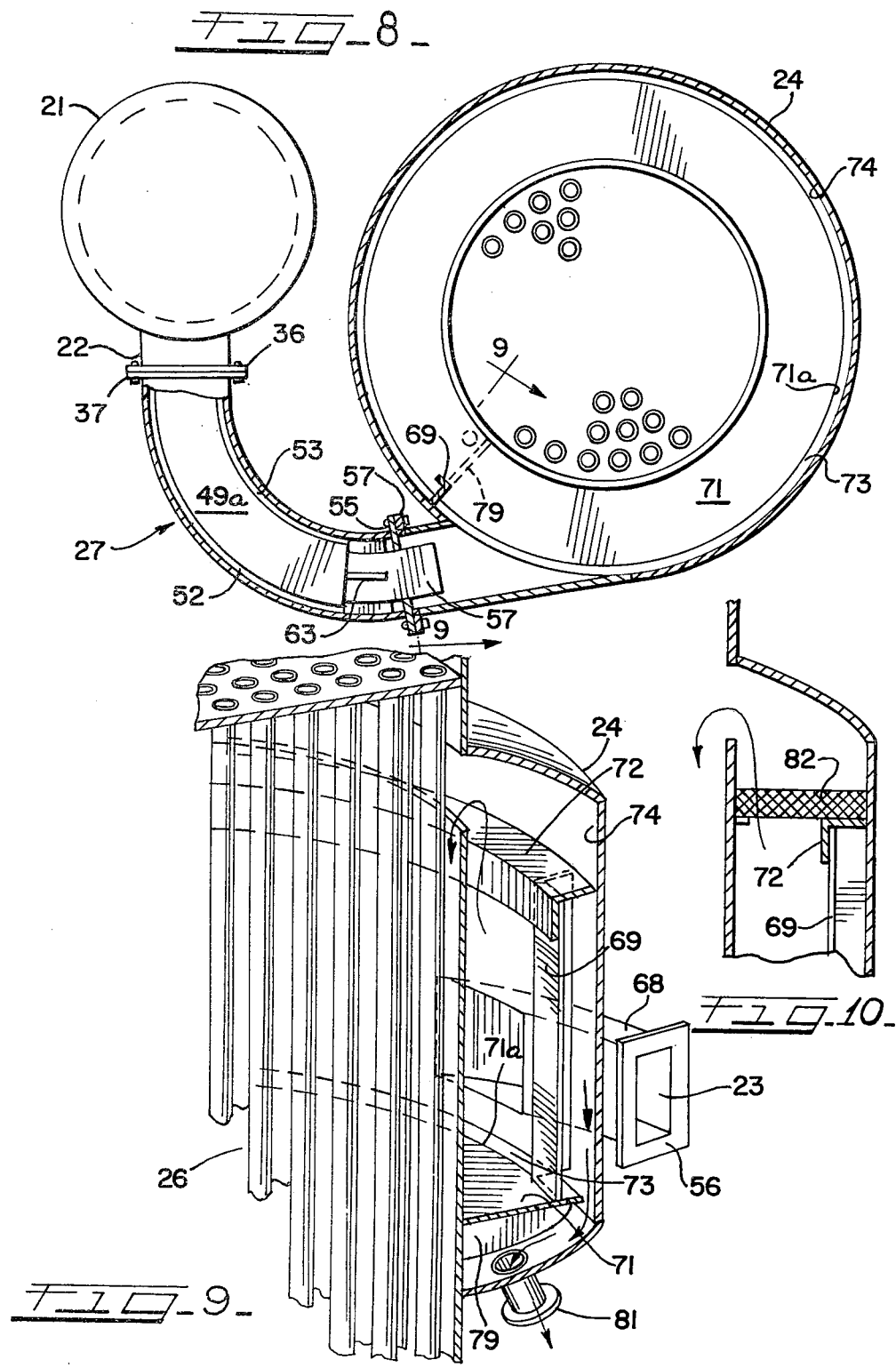

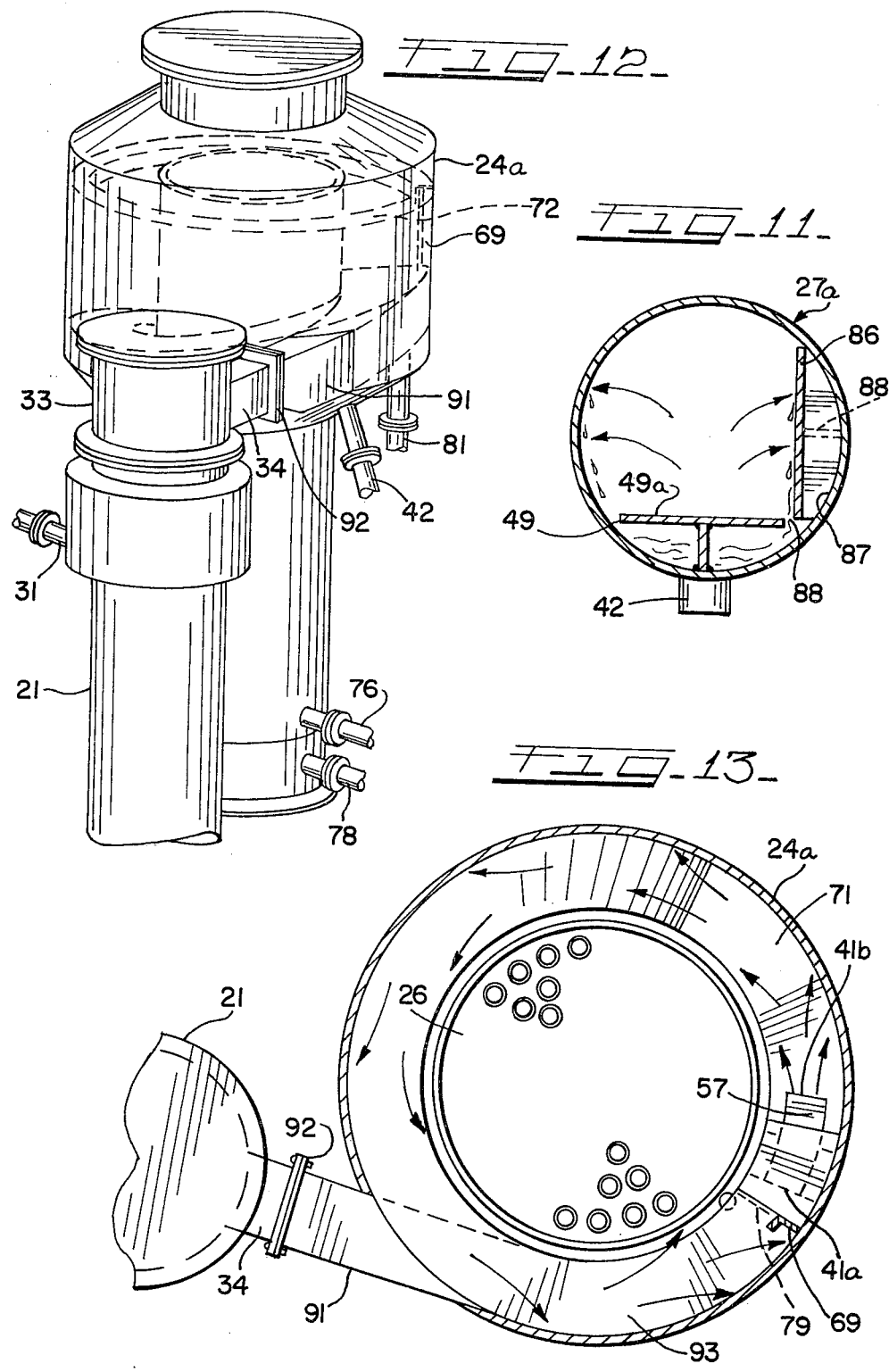

LIQUID-VAPOR SEPARATION DEVICE AND METHOD

BACKGROUND AND DESCRIPTION OF INVENTION

The present invention generally relates to improvement in apparatus and method for separation of liquid from a liquid-vapor mixture and, more particularly, is directed to an improved liquid-vapor separation device and method which utilizes both gravitational and centrifugal forces to provide improved efficiency in the separation of entrained liquid from a liquid-vapor mixture. In this regard, an important aspect of the present invention is concerned with the utilization of this improved liquid-vapor separation device and method in place of a conventional vapor head in an evaporation apparatus.

The operation of evaporation or concentration of liquid solutions through solvent removal is achieved with various forms of evaporator apparatus such as, for example, calandria type evaporators and long tube vertical evaporators, all of which conventionally utilize gravity for separation of liquid droplets from a vapor stream discharged from the heater component thereof. In order to achieve effective separation of entrained liquid from the vapors emitted from the heater via such gravitational separation devices, it is essential that the vapor velocity be substantially reduced upon being discharged from the heater. Heretofore this velocity reduction has been achieved by the use of an enlarged entrainment disengaging space, or vapor head. Such vapor heads, in order to achieve the desired degree of liquid removal from the liquid-vapor mixture, are inherently large in size and as a result thereof characterized by high material and labor costs. Another disadvantage of such vapor heads is that they typically require field fabrication, as opposed to shop fabrication.

In accordance with the present invention, an improved liquid-vapor separation and method are provided which are capable of achieving upwards of 99% removal of liquid from a liquid-vapor mixture such as, for example, that which is discharged from the tube side of a heater in a natural circulation evaporator. If desired, however, this device and method can be used alone or in conjunction with auxiliary liquid-vapor separation equipment such as a tangential separator or the like. The device is substantially smaller in size than a conventional vapor head and offers significant advantages insofar as reduced capital cost, not only by reason of lower material and labor costs, but also because of its being able to be shop-fabricated and shipped to the construction site rather than requiring field fabrication.

This apparatus, in accordance with an important aspect of this invention, includes a generally horizontally-disposed arcuate passageway which interconnects the outlet of the tube side of the heater component of the evaporator to a condensor or subsequent effect heater. A floor plate is disposed in the arcuate passageway in spaced-away relation from the side walls thereof so as to permit drainage of liquid collected on the interior walls of the passageway into a liquid-collecting section which is provided with a suitable drain for removal of the thus-collected liquid. The floor plate, however, is of sufficient size to minimize re-entrainment of the collected liquid. Adjacent the outlet end of the device, a Borda-type device can be provided which incorporates anti-swirl baffles extending from the outer walls thereof to the interior of the passageway to eliminate turbulence in the vapor.

It is, therefore, an object of the present invention to provide an improved apparatus and method for removal of entrained liquid particles from a liquid-vapor mixture.

Another object of the present invention is to provide an improved evaporator apparatus and method wherein separation of entrained liquid from a liquid-vapor mixture exiting from the heater tubes is achieved through the utilization of both gravitational and centrifugal forces.

Another object of the present invention is to provide an improved evaporator apparatus and method wherein separation of entrained liquid from a liquid-vapor mixture exiting from the heater tubes thereof is achieved through the utilization of a liquid-vapor separation device which is substantially smaller in size, less costly to produce than a conventional vapor head and which also offers the advantage of being able to be shop fabricated.

Another object of the present invention is to provide an improved liquid-vapor separation device which provides improved performance over conventional liquid-vapor separation devices such as, for example, enlarged entrainment disengaging spaces or vapor heads.

Another object of the present invention is to provide an improved liquid-separation apparatus and method which are particularly suitable for use in natural circulation evaporators.

Another object of the present invention is to provide an improved liquid-vapor separation apparatus and method which can be used either by itself or in combination with auxiliary liquid-vapor separation equipment.

These and other objects of the present invention will be apparent from the detailed description, taken in conjunction with the accompanying signs wherein like reference numerals refer to like parts, in which:

FIG. 1 is a perspective view of an evaporator apparatus equipped with the novel liquid-vapor separation device of the present invention;

FIG. 2 is an enlarged fragmentary perspective view, partially broken away, of the liquid-vapor separation device shown in FIG. 1;

FIG. 3 is a fragmentary plan view, partially in phantom, of the liquid-vapor separation device shown in FIGS. 1 and 2;

FIG. 4 is a side elevational view, partially in phantom and partially broken away, of the liquid-vapor separation device shown in FIGS. 1 through 3;

FIG. 5 is an end view of the outlet of the liquid-vapor separation device shown in FIGS. 1 through 4, taken along the line 5—5 of FIG. 4;

FIG. 6 is a sectional view of the liquid-vapor separation device shown in FIGS. 1 through 5, taken along the line 6—6 of FIG. 4;

FIG. 7 is a sectional view of the liquid-vapor separation device shown in FIGS. 1 through 6, taken along the line 7—7 of FIG. 4;

FIG. 8 is a plan view, partially broken away and partially in phantom, of the evaporator apparatus shown in FIG. 1, taken in the direction generally indicated by the arrows 8—8 in FIG. 1;

FIG. 9 is an enlarged fragmentary perspective view, partially broken away, of the inlet to the tangential separator shown in FIGS. 1 and 8, taken in the direction generally indicated by the arrows 9—9 in FIG. 8;

FIG. 10 is an enlarged fragmentary perspective view, partially broken away, of a modified tangential separator;

FIG. 11 is a cross-sectional view of an alternative embodiment of liquid-vapor separation device of the present invention;

FIG. 12 is a fragmentary perspective view, partially in phamtom, illustrating an evaporator apparatus equipped with a further embodiment of the liquid-vapor separation device of the present invention; and, FIG. 13 is a fragmentary plan view, partially in phantom and partially broken away, of the evaporator apparatus shown in FIG. 12.

Referring to the drawings, and with particular reference to FIGS. 1 through 9, the reference numeral 20 generally depicts an evaporator which includes a heat-exchanger 21 having a vapor outlet 22, interconnected to a vapor inlet 23 of a tangential separator 24, operatively associated with a surface condensor 26. In accordance with an important aspect of the present invention the vapor outlet 22 of the heat exchanger 21 is interconnected to the vapor inlet 23 of tangential separator 24 by a liquid-separation device 27 which is best illustrated in FIGS. 2-7.

As generally depicted in FIG. 1, heat exchanger 21 includes a feed inlet 28 which communicates with the tube side of the heat exchanger for transmission of a liquid feed to be heated through the tubes (not shown) in the generally cylindrical elongated body 29 thereof. The shell side of the heat exchanger is supplied with a suitable heating medium, such as for example steam, through an appropriate inlet generally designated by the reference numeral 31 at the upper end thereof. The heating medium is passed through the shell side of the heat exchanger in surrounding relation to the tubes in the cylindrical body 29 and exits from a lower end thereof at a suitable condensate outlet 32.

Liquid feed, which is heated within the heat exchanger 21 is discharged into the interior of an upper section 33 of the heat exchanger. As shown in FIGS. 1 and 8, heat exchanger vapor outlet 22 includes a passageway 34 equipped with a mounting flange 36 which is directly connected to a mounting flange 37 of the liquid-separation device 27. Accordingly, the vapor-liquid mixture which is discharged from the upper end of the tube side of the heat exchanger 21 is, in turn, communicated directly into the interior of liquid-separation device 27 via vapor outlet 22. In this regard, it will be appreciated that, unlike conventional evaporation apparatus, the heat exchanger 21 of evaporator 20 does not discharge into a so-called vapor head since liquid-separation is effectively achieved, as will be hereinafter described, by the liquid-vapor separation device 27.

As best shown in FIGS. 2 through 7, in the illustrated embodiment of the liquid-vapor separation device includes an elongated arcuate body 38 having an inlet 39 which receives a vapor-liquid mixture directly from the outlet 22 of heat exchanger 21 for passage through the liquid-vapor separation device, wherein effective separation of the liquid component from the 2-phase mixture is achieved via both gravitational and centrifugal forces, resulting in a substantially liquid-free vapor exiting through an outlet 41 thereof and the separated liquid exiting through a drain or primary liquid outlet 42.

Referring to FIG. 7, it will be noted that the liquid-vapor separation device in the illustrated embodiment is of generally rectangular cross-section including a top wall 44, side walls 46 and 47 and a bottom wall 48. A floor plate 49 spaced from the bottom wall 48 and supported by any suitable means such as, for example, the vertical support member 51, has an upper surface 49a which is at substantially the same elevation, and is in contact with, the bottom ledge 37a of inlet flange 37. Floor plate 49 is sized so as to provide a drainage gap between the sides thereof and the interior side walls 46a and 47a. A pair of drainage gaps 52 and 53 are thereby provided, permitting liquid which is removed from the liquid-vapor mixture to pass into a liquid receiving chamber 54 in the lower portion of the arcuate body 38, from which it is discharged through the drain 42.

In accordance with a preferred embodiment of the present invention, the vapor outlet 41 incorporates a so-called Borda-Entrance-Exit 41a–41b which is supportingly received by a flange 55 which is adapted to be coupled to a like flange 56 at the inlet 23 of the tangential separator 24. As best shown in FIGS. 2, 3, 4 and 6, the Borda-device includes an elongated body 57 of generally rectangular cross-section defined by a top wall 58, a pair of side-walls 59 and 61 and a bottom wall 62. A plurality of anti-vortex or anti-swirl baffles 63, 64, 66 and 67 radially extend between the outside surfaces of walls 58, 59, 61 and 62 of the Borda-device and walls 44, 46 and 47 and floor plate 49 of the separation device 27, respectively.

As shown in the illustrated embodiment, the elongated body 57 of the Borda-Exit 41b terminates exteriorly of the liquid-separation device, resulting in a portion of such body being located interiorly of the liquid-separation device and a portion thereof being located exteriorly thereof. In accordance with one aspect of the present invention, the body 57 of the Borda-device extends into the passageway defined by arcuate body 38 a distance substantially equal to the axial extent of the anti-swirl baffles 63, 64, 66 and 67.

In operation, the bulk of the liquid contained in the liquid-vapor mixture entering the separator 27 will be removed from such two-phase mixture at or near the inlet 39, primarily due to the influence of gravitational forces. Smaller droplets, however, are separated from the mixture as centrifugal forces are exerted thereon during the passage thereof through the arcuate body 38 of the separator 27. Typically, such small droplets are separated in the first half or three-quarters of the passage by the centrifugal force. It will be appreciated, however, that the extent of removal of such liquid droplets and precise location of such removal will depend upon the length of the separator and the extent to which centrifugal forces are imparted to the liquid droplets. Typically, the arcuate sweep or angular orientation of the arcuate body 38 measured by the angle alpha (FIG. 3) can range from as little as 45° to as much as 270° with the angular sweep of from approximately 90° to 120° being preferred. Length of the arcuate body will depend upon the nature of the vapor-liquid mixture being passed through and the extent to which separation of such liquid component from the vapors is desired. In this regard, it should be noted that while it is preferred that the body 38 is arcuate in configuration, intercommunication of inlet 39 to the outlet 41 of the liquid-separation device 27 can also be effectively achieved through a plurality of straight passages which provide for the imparting of the centrifugal forces on the liquid-vapor mixture as it passes through such body.

Flow from the separator 27 is, in the illustrated embodiment, communicated directly to the tangential separator 24 and surface condensor 26. In this regard, it will be appreciated while upwards of 99% of the entrained liquid can be removed by liquid-vapor separator 27, auxiliary or secondary separation can be used in conjunction therewith, if desired. As shown, tangential separator 24 is in flow communication with the shell side of the surface condensor 26. Where appropriate, however, condensor 26 could be a subsequent effect heater.

As shown in FIGS. 8 and 9, inlet 23 communicates with an annual passageway in the interior of tangential separator 24 through a conduit 68 located upstream from a vertical stop plate 69 which, in the illustrated embodiment, is depicted as an angle iron extending vertically between a floor plate 71 and a skirt baffle 72. A liquid drain passage 73 is defined by the open space between the outer edge 71a of floor plate 71 and the interior side wall 74 of the tangential separator 24. In this manner, vapor entering the inlet 22 is discharged into the interior of tangential separator 24 for circumferential travel therethrough and is then discharged into the shell side of the condensor 26, wherein the condensible vapors contained therein are condensed and discharged through an outlet 76. Noncondensible gases, in accordance with known techniques, can be removed by conventional venting arrangements. A suitable cooling medium such as, for example, water can be supplied to and removed from the tube side of the condensor 26 via inlet 77 and outlet 78.

As is apparent from FIG. 9, re-entrainment of liquids separated in tangential separator 24 is substantially eliminated by skirt baffle 72 which prevents run-up of liquid along the interior wall 74 and stop plate 69 which precludes recirculation of the liquid droplets collected on the interior wall 74 around the periphery of interior wall 74. As shown, an anti-swirl plate 79 is also provided in the interior of the tangential separator 24 below floor plate 71 and adjacent a drain or secondary liquid outlet 81.

If desired, as shown in FIG. 10 a mesh separator 82 can be located at the upper end of the angular channel 40 which receives vapor from inlet 23 for effecting a further separation of any remaining liquid droplets in the feed to the separator 24 prior to the transmission thereof into the tube side of the condensor 26.

As previously noted, arcuate body 38 can have a configuration other than the rectangular configuration previously described. For example, in FIG. 11, an alternative embodiment of liquid-vapor separation device 27a is depicted which is identical to its counterpart previously described and designated by the reference numeral 27, with the exception of its having a generally circular configuration and a vertical interior wall 86, onto which liquid droplets will impinge as a result of centrifugal forces being imparted thereto during travel through the passageway defined thereby. As shown, vertical wall 86 is mounted to the interior surface 87 by a support member 88 and terminates at a location sufficient to provide a drain slot 89 for transmission of collected liquid particles therethrough into the liquid receiving chamber 54 and discharge therefrom through drain 42.

Referring to FIGS. 12 and 13, a further embodiment to the present invention is described which functionally corresponds to the previously-described embodiment. In the embodiment of the FIGS. 12 and 13, however, the liquid-vapor separator is contained within the interior of the tangential separator 24a. Accordingly, like reference numerals have been used to denote components in the FIGS. 12 and 13 embodiment which are identical to their counterparts in the previously-described embodiment. As shown, the passageway 34 communicates with a liquid-separation device 91 having an inlet 92 and combined straight-arcuate passageway 93 in which centrifugal forces will be imported to the vapor-liquid mixture received therein. Separator 91 is provided with a floor plate similar to floor plate 49, which is sized so as to permit the transmission of collected liquid between the sides thereof and the interior side walls of the separator into a liquid-collecting chamber comparable to the liquid-collecting chamber 54 of the previously-described embodiment. In FIGS. 12 and 13 embodiment, the floor plate of the tangential separator component is preferably of inclined configuration so as to facilitate the upward passage of vapor within the tangential separator into the shell side of the condensor 26.

In the foregoing specification, for purposes of illustration, specific embodiments of the present invention have been set forth in detail. It will be apparent, however, to those skilled in the art that many of these details can be varied without departing from the spirit of the present invention. Accordingly, this invention is to be limited only by the scope of the appended claims.

I claim:

1. An improved liquid-vapor separation device, comprising a generally horizontally disposed elongated body which defines an arcuate passageway of a given cross-sectional area, an inlet at one end of said body for receiving a liquid-vapor mixture, an end wall at the other end of said body, an outlet in said end wall for discharge of a substantially liquid-free vapor therefrom, said outlet having a reduced cross-sectional area with respect to said given cross-sectional area of said arcuate passageway, a floor plate in said body extending along substantially the entire extent of said arcuate passageway, said floor plate being spaced above a bottom wall of said elongated body and defining a liquid-collection chamber therebetween, said floor plate being spaced away from at least one side wall of said elongated body a sufficient distance to permit drainage of liquid droplets which collect on said side wall into said liquid-collection chamber, a liquid drain in said bottom wall for removal of liquid which accumulates in said liquid-collection chamber, a skirt axially extending into said arcuate passageway from said end wall in surrounding relation to said outlet, and baffle means in surrounding relation to said skirt for substantially eliminating vapor swirl adjacent said outlet.

2. The improved liquid-vapor separation device of claim 1 wherein the extent of said arcuate passageway defines an angle of from approximately 45° to approximately 270°.

3. The improved liquid-vapor separation device of claim 1 wherein the extent of said arcuate passageway defines an angle of from approximately 90° to approximately 120°.

4. The improved liquid-vapor separation device of claim 1 wherein said skirt axially extends from said end wall both into and away from said passageway in said body.

5. The improved liquid-vapor separation device of claim 1 wherein said passageway is of generally rectangular cross-section.

6. The improved liquid-vapor separation device of claim 1 wherein said passageway is of generally circular cross-section.

7. The improved liquid-vapor separation device of claim 1 wherein said outlet is in direct communication with a secondary liquid-vapor separation device.

8. An improved evaporator apparatus, comprising a generally cylindrical body defining a shell side in said apparatus, a plurality of tubes mounted in said apparatus extending through said shell side, a tube side inlet in said apparatus communicating with one end of said tubes, a tube side outlet in said apparatus communicating with the other end of said tubes, means for passing a liquid feed to be heated into said inlet and from said inlet through said tubes, an inlet and outlet in said shell side for passing a heating medium through said shell side in surrounding relation to said tubes for heating and at least partially vaporizing at least a portion of a liquid feed which is passed through said tubes to produce a liquid-vapor mixture which is discharged through said tube side outlet, a liquid-vapor separation device directly connected to said tube side outlet, said liquid-vapor separation device including a generally horizontally disposed elongated body which defines an arcuate passageway, an inlet at one end of said body for receiving said liquid-vapor mixture, an end wall at the other end of said body, an outlet in said end wall for discharge of a substantially liquid-free vapor, a floor plate in said body extending along and substantially the entire extent of said arcuate passageway, said floor plate being spaced above a bottom wall of said elongated body to define a liquid collection chamber in said body between the floor plate and the bottom wall of said elongated body, said floor plate being spaced away from at least one side wall of said elongated body a sufficient distance to permit drainage of liquid droplets which collect on said side wall into said liquid collection chamber, a liquid outlet in said bottom wall for removal of liquid which accumulates in said liquid collection chamber, a skirt axially extending into said passageway from said end wall in surrounding relation to said outlet, and baffle means in surrounding relation to said skirt for substantially eliminating vapor swirl adjacent said outlet.

9. The improved evaporator apparatus of claim 8 wherein the extent of the arcuate passageway of said liquid-vapor separation device defines an angle of from approximately 45° to approximately 270°.

10. The improved evaporator apparatus of claim 8 wherein the extent of the arcuate passageway of said liquid-vapor separation device defines an angle of from approximately 90° to approximately 120°.

11. The improved evaporator apparatus of claim 8 wherein the skirt of said liquor-vapor separation device extends both into and away from said end wall.

12. The improved evaporator apparatus of claim 8 wherein the passageway of said liquid-vapor separation device is of generally rectangular cross-section.

13. The improved evaporator apparatus of claim 8 wherein the passageway of said liquid-vapor separation device is of generally circular cross-section.

14. The improved evaporator apparatus of claim 8 wherein the outlet of said liquid-vapor separation device directly communicates with a secondary liquid-vapor separation device.

15. An improved method for separating entrained liquid from a liquid-vapor mixture, comprising passing said mixture through an arcuate passageway of a given cross-sectional area at a velocity sufficient to effect centrifugal separation of at least a portion of the entrained liquid and impingement thereof onto a side wall of the passageway, collecting centrifugally separated liquid in a chamber which is separate from said arcuate passageway, withdrawing said centrifugally separated liquid from said chamber, and discharging a substantially liquid-free vapor through an outlet of said passageway, said outlet having vapor swirl prevention means associated therewith and a reduced cross-sectional area with respect to the cross-sectional area of said arcuate passageway.

16. The method of claim 15 wherein the extent of said passageway defines an angle of from approximately 45° to approximately 270°.

17. The method of claim 15 wherein the extent of said passageway defines an angle of from approximately 90° to approximately 120°.

* * * * *

UNITED STATES PATENT AND TRADEMARK OFFICE
CERTIFICATE OF CORRECTION

PATENT NO. : 4,270,975
DATED : June 2, 1981
INVENTOR(S) : Richard C. Bennett

It is certified that error appears in the above-identified patent and that said Letters Patent are hereby corrected as shown below:

Column 2, line 37, "signs" should read --drawings--

Column 5, line 18, "22" should read --23--

Signed and Sealed this

Sixth Day of October 1981

[SEAL]

Attest:

GERALD J. MOSSINGHOFF

Attesting Officer        Commissioner of Patents and Trademarks